UNITED STATES PATENT OFFICE 2,517,709

PURIFICATION OF BICYCLIC ACID C₁₀H₁₆O₂

Earl L. Pelton, Midland, Mich., assignor to The Dow Chemical Company, Midland, Mich., a corporation of Delaware No Drawing. Application June 20, 1949,
Serial No. 100,304

3 Claims. (Cl. 260—514)

This invention relates to a new method of purifying the crude crystalline monocarboxylic acid $C_{10}H_{16}O_2$ produced by the caustic alkali fusion of hydroxy-tetrahydro-nor-dicyclopentadiene.

In a copending application Serial No. 85,271 filed April 2, 1949, by the present applicant and others, there is described a bicyclic monocarboxylic acid having the empirical formula $C_{10}H_{16}O_2$, melting at 49.3° to 49.5° C. and boiling at about 160° C. at an absolute pressure of 14 to 15 millimeters of mercury. As there explained, this acid may be produced by the oxidation of hydroxy-tetrahydro - nor - dicyclopentadiene (hydroxytetrahydroexodicyclopentadiene; J. Am. Chem. Soc. 70, 2809 (1948)) with fused caustic alkali at a temperature of 275° to 375° C. and subsequent acidification of the product. The structure of the acid has not been proved beyond doubt, but it is believed to be either 1,-methyl-(3,3,0 - bicyclooctane) - 3,- carboxylic acid or 1-(3,3,0-bicyclooctane)-acetic acid. On the former assumption, an equation for the fusion step of its preparation may be written as:

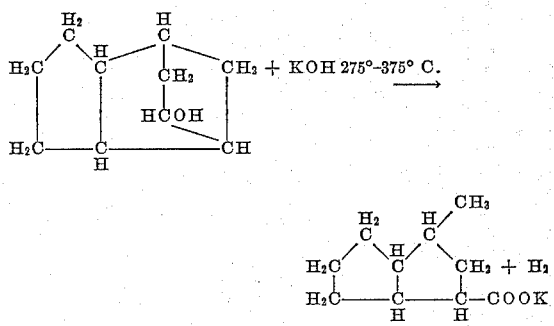

The crude crystalline acid prepared by acidifying the fusion product is contaminated with an oily substance from which it cannot be separated by rectification. Purification of the desired acid has therefore been accomplished only by tedious procedures, either by fractional freezing, which is only partly effective, or by fractional crystallization from an organic solvent such as acetone. However, the acid is so soluble in most solvents that the crystallization must be carried out at very low temperatures to get even a fair recovery. Consequently, the purification has at best been troublesome, time-consuming, and somewhat wasteful.

It is therefore the principal object of the present invention to provide a process for purifying the crude crystalline acid which replaces the fractional crystallization step of prior practice and eliminates the use of expansive solvents.

According to the invention, the crude crystalline acid $C_{10}H_{16}O_2$ is purified by dispersing it in water at a temperature above the melting point of the acid and containing a small proportion of an emulsifying agent. The resulting dispersion is then cooled to a temperature below the melting point of the acid, thus causing the latter to separate from the dispersion as a discrete solid phase. This phase is substantially free of water soluble and oily impurities, which remain dissolved or dispersed in the aqueous medium. The solidified acid may then be recovered from the cooled dispersion, as by filtration, and then washed with water and dried.

This procedure, which is simple, rapid, and inexpensive, is highly effective in removing the impurities from the crude acid. The product of a single application of the process is usually sufficiently pure to be acceptable for most uses to which the acid is placed. If a material of extreme purity is required, the process may be repeated one or more times with a given batch of material. Optionally, it may be combined with a fractional crystallization of the type employed heretofore, except that the procedure for the latter may be greatly simplified since the main burden of purification is carried by the new treatment.

The emulsifying agent used in the process may be any surface-active or wetting agent capable of suspending oily materials in water. Synthetic detergents, such as the hymolal salts, e. g. sodium lauryl sulfate, and the aryl alkyl sulfonates, which form no precipitates in hard waters are preferred. However, ordinary soaps are effective if demineralized water is used. An extensive list of surface-active agents now available commercially is found in Chemical Industries, vol. 61, pp. 811–824 (Nov. 1947). In general the concentration of emulsifying agent in the water should be between about 0.1 and about 2 per cent by weight.

In a preferred method of carrying out the invention, the crude acid to be purified is first melted, if it is not already molten, and then is added gradually with violent agitation to an at least equal volume of water containing an emulsifying agent. The exact volume of water is not important except that there should be enough to give a slurry of crystals thin enough to pour or pump easily. The water is preferably also at a temperature above the melting point of the crude acid before the latter is stirred in, although the water may be heated to the operating temperature in the early stages of the addition. When introduction of the acid is complete, the resulting dispersion is cooled, with agitation being continued, until the acid is solidified, usually in the form of crystals, granules, or occasionally dough-like masses, which remain mechanically suspended in the water. The emulsion may be seeded with crystals of the acid to hasten solidification, if necessary. When solidifying is complete, agitation is stopped and the mixture is filtered to separate the acid. The latter is then washed thoroughly with water, and is dried, after which it is ready for use.

In those cases where the amount of oily impurity in the crude acid is small, it is advantageous to introduce into the dispersion a small proportion of a water-insoluble organic solvent, such as carbon tetrachloride or ethyl benzene. This solvent tends to keep the oily impurity emulsified in the water phase, making more complete its removal by the process.

If it is desired to recover the oily matter separated from the crystalline acid, it is necessary only to dilute the aqueous filtrate in which it is contained with more water, saturate the diluted mixture with salt, and heat it slightly. The oil then separates as a liquid phase which can be drawn off.

The following example will further illustrate the invention.

Example

The crude acid $C_{10}H_{16}O_2$, prepared as described above, was a yellowish color and had a freezing point of about 36° C. A charge of 750 c.c. of crude molten acid was poured slowly with agitation into an equal volume of water at about 40° C. containing 10 c.c. of Solvadine NC solution (an alkyl aryl sulfonate wetting agent). The resulting fine milky emulsion was cooled gradually to 20° C., whereupon it thickened due to the separation of fine crystals of the acid. The entire mixture was filtered through a basket centrifuge, the residue, which was the desired acid, being washed repeatedly with cool water. After removal from the centrifuge, the crystals were dried by melting under vacuum. The resulting acid was water-white in color, did not discolor on prolonged standing in sunlight, and froze sharply at 46.5° C.

What is claimed is:

1. A method of purifying the crude crystalline acid $C_{10}H_{16}O_2$ preparable by the caustic alkali fusion of hydroxytetrahydro-nor-dicyclopentadiene which comprises dispersing the crude acid in water at a temperature above the melting point of the crude acid and containing a small proportion of an emulsifying agent, cooling the resulting dispersion to a temperature below the melting point of the acid until the acid separates as a solid phase, and separating the solidified acid from the cooled dispersion.

2. A method of purifying the crude crystalline acid $C_{10}H_{16}O_2$ prepared by the caustic alkali fusion of hydroxytetrahydro-nor-dicyclopentadiene at a temperature of 275° to 375° C. and acidification of the fusion product which comprises agitating the crude acid while molten with an at least equal volume of water at a temperature above the melting point of the crude acid and containing from 0.1 to 2.0 per cent by weight of an emulsifying agent to form a dispersion, cooling the resulting dispersion with agitation to a temperature below the melting point of the acid until the latter separates from the dispersion as a finely-divided solid, filtering the cooled dispersion to separate the solid acid, washing the solid thus separated, and thereafter drying it.

3. A method according to claim 2 wherein the emulsifying agent is an alkyl aryl sulfonate.

EARL L. PELTON.

No references cited.